United States Patent [19]

Andrews

[11] Patent Number: 4,457,633

[45] Date of Patent: Jul. 3, 1984

[54] TEMPERATURE PROBE COVER

[75] Inventor: Harry J. Andrews, Marblehead, Mass.

[73] Assignee: Kidde, Inc., Saddle Brook, N.J.

[21] Appl. No.: 362,102

[22] Filed: Mar. 26, 1982

[51] Int. Cl.³ .......................... H01R 11/00; G01K 1/08
[52] U.S. Cl. ..................................... 374/209; 206/306; 339/59 R; 374/183
[58] Field of Search ............... 374/158, 163, 208, 165, 374/169; 339/59 R; 206/306; 338/28; 128/736

[56] References Cited

U.S. PATENT DOCUMENTS

| | | | |
|---|---|---|---|
| 3,076,339 | 2/1963 | Barton | 374/158 X |
| 3,153,769 | 10/1964 | Moses | 338/28 |
| 3,254,533 | 6/1966 | Tongret | 374/165 |
| 3,530,718 | 9/1970 | Ehlo | 338/28 X |
| 3,738,172 | 6/1973 | Sato | 206/306 X |
| 3,763,458 | 10/1973 | Taormina et al. | 339/59 R |
| 3,832,669 | 8/1974 | Mueller et al. | 206/306 X |
| 3,949,609 | 4/1976 | Hammerslag | 374/185 |
| 4,166,389 | 9/1979 | Montren | 374/158 |
| 4,280,508 | 7/1981 | Barrada | 128/765 F |
| 4,283,100 | 8/1981 | Griffin et al. | 339/59 R X |
| 4,284,312 | 8/1981 | Patchett et al. | 339/60 R |
| 4,341,992 | 7/1982 | Goldstein | 374/158 X |

Primary Examiner—Daniel M. Yasich
Attorney, Agent, or Firm—John E. Toupal; Harold G. Jarcho

[57] ABSTRACT

A thermometer for temperature measurement of a body is provided wherein a temperature probe electrically connects to a temperature read-out means and a probe cover or sheath fits over such probe. The sheath has a temperature sensor e.g. a thermistor mounted thereon, which sensor is electrically connected to the probe when such probe is inserted into such sheath to provide a rapid measurement and read-out of the temperature of a body. The sheath with temperature sensor is disposable and readily replaced for the next use of the electric thermometer of the invention. Alternatively, the sheath can be sterilized for reuse.

4 Claims, 8 Drawing Figures

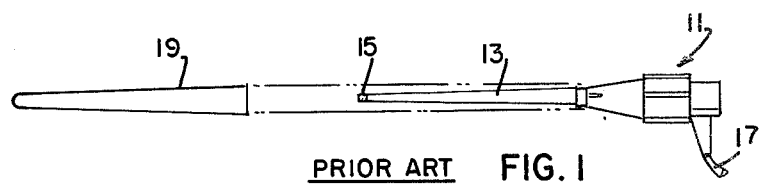
PRIOR ART  FIG. 1
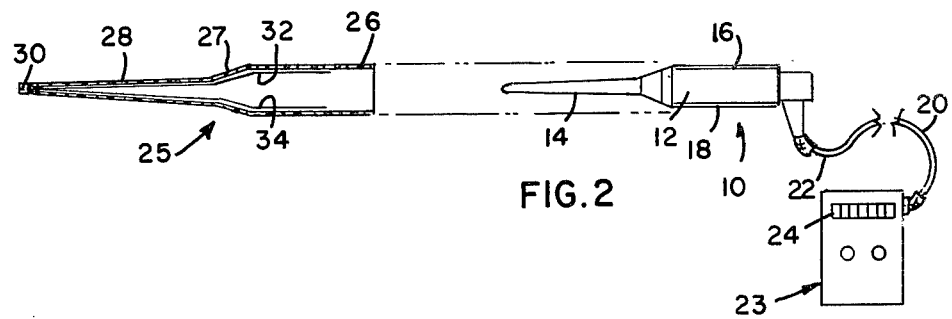
FIG. 2
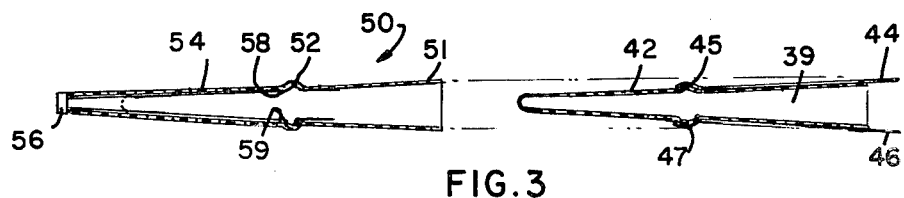
FIG. 3
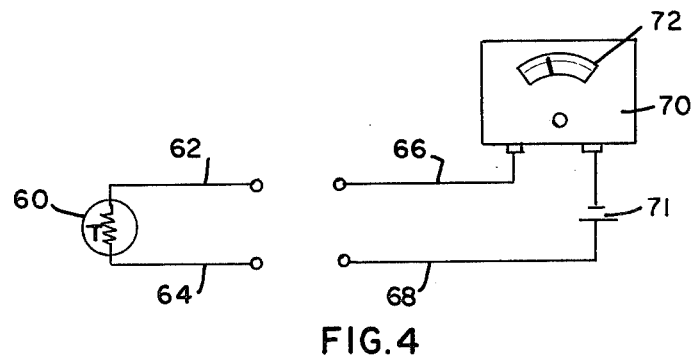
FIG. 4

TEMPERATURE PROBE COVER

BACKGROUND OF THE INVENTION

1. Field of the Invention

This invention relates to temperature sensing of a body particularly temperature sensing and measurement of a body.

2. The Prior Art

Temperature measurement of bodies, e.g., animals or humans has widely been done with the conventional glass thermometer. Such thermometer, however, has numerous drawbacks; it must be shaken before use, a delay of minutes is required before it registers the patient's temperature, it must be sterilized from patient to patient and it has breakage problems. In an attempt to overcome the above shortcomings electrical thermometers have been developed. These electrical thermometers generally include a probe member having a temperature sensor mounted at the leading end thereof, which sensor is electrically connected to a read-out means such as a meter or display. To meet the problems of sterilization from patient to patient, such probes are provided with disposable probe covers, usually thermoplastic tubes; see for examples, U.S. Pat. Nos. 3,349,896 and 3,832,669.

However, the above disposable probe covers or sheaths, delay the transmission of the patient's temperature to the temperature sensor of the probe and in turn, the temperature read-out means, which results in uncertainty and delay in the temperature taking and measuring proces. To overcome such delay, probe covers have been developed having a metal tip in the sensing end thereof, for improved thermal conductivity; see for examples, U.S. Pat. Nos. 3,738,479, 3,929,018, and 4,117,926. However, while such metal tipped probe covers reduce the delay of temperature transmission from the patient to the temperature sensor of the probe, a significant temperature transmission delay persists.

There is therefore, a need and market for an electric thermometer which, though employing a disposable probe cover, substantially obviates the above prior art shortcomings.

There has now been discovered an electric thermometer including a probe and a disposable probe cover in which upon contact of the probe and probe cover of the invention with the patient, the thermal transmission delay associated with prior art covers is minimized or eliminated and the time in obtaining a temperature measurement or read-out of such patient is markedly reduced.

SUMMARY

Broadly the present invention provides an instrument for temperature measurement comprising a temperature probe, which probe electrically connects to a temperature read-out means. A probe cover fits at least partially over the probe, which cover has a temperature sensor mounted thereon. The sensor is electrically connectable to the probe when the probe is inserted into the cover to provide a rapid measurement and read-out of the temperature to be measured.

In one embodiment the temperature probe is inserted into the above cover e.g. a sheath, probe and sheath are inserted into the body to be measured, the temperature measurement is taken, the probe and sheath are withdrawn from the body and the sheath can then be discarded or sterilized for re-use.

BRIEF DESCRIPTION OF THE DRAWINGS

The invention will become more apparent from the following detailed specification and drawings in which;

FIG. 1 is an elevation view of a prior art thermometer;

FIG. 2 is an elevation view, partly in section, of an electrical thermometer embodying the present invention;

FIG. 3 is a fragmentary, sectional elevation view of components of another embodiment of the electrical thermometer embodying the present invention;

FIG. 4 is a block schematic diagram of the electrical thermometer embodying the present invention;

DESCRIPTION OF PREFERRED EMBODIMENT

Figure 5:
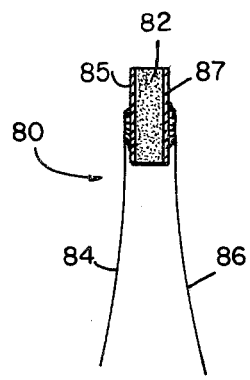
FIG. 5 is an elevation view of a component of the electrical thermometer embodying the present invention.

An electrical thermometer of the prior art is shown in FIG. 1 wherein temperature probe 11, having probe arm 13, terminates in an electrical temperature sensor 15 e.g. a thermistor, mounted at the leading end thereof and connects at the other end thereof by cable 17 to a temperature read-out means, not shown. A disposable probe cover or sheath in the form of a plastic tube 19, fits over the temperature sensor 15 and the probe arm 13, as indicated in FIG. 1. The plastic tube 19 is closed at the smaller end thereof and encloses the temperature sensor 15 of the probe 11, which causes delay in the temperature of the patient reaching the so-enclosed temperature sensor 15, which prolongs the time required to take the patient's temperature to e.g., 30 seconds or more.

According to the present invention, probe 10 embodying the present invention, has barrel 12 tapering to probe arm 14 having no temperature sensor thereon, as shown in FIG. 2. The probe barrel 12 has electrical connector conductors 16 and 18 mounted thereon which connect respectively to conductors 20 and 22 and then to read-out meter 23, having a display 24, as shown in FIG. 2.

A probe cover 25 in the form of a larger plastic tube 26, a frustro-conical or tapering portion 27 and a smaller tapering tube arm portion 28, which terminates in an electrical temperature sensor 30 mounted thereon, is also shown in FIG. 2. The temperature sensor 30 has electrical connector leads 32 and 34, which extend rearwardly to the inside of the larger tube portion 26 so as to make electrical contact with the conductors 16 and 18 on the probe barrel 12, when the probe 10 is inserted fully into frictional engagement with the probe cover or sheath 25, as shown or indicated in FIG. 2.

Accordingly, the probe arm 14 serves to support or rigidify the shape of the probe cover 25 and need not (when inserted fully in the cover 25) extend in such portion 28 to the temperature sensor 30 although it may so extend, if desired, within the scope of the present invention.

In another embodiment of the invention, temperature probe 38 having body 39, nib portion 40 and probe arm 42, which inserts into probe cover or sheath 50, having similarly contoured hollow body portion 51, bulb portion 52 and stem portion 54, to which is mounted electrical temperature sensor 56, is shown in FIG. 3. The temperature sensor 56 has a pair of electrical connector leads 58 and 60 in the form of wire or metal foils which extend to spaced inner surfaces of the bulb portion 52 of the probe cover 50 so as to electrically contact mating electrical connector conductors 45 and 47, mounted on the nib portion 40 of the probe 38, when such probe is fully inserted and snaps into place within the mating probe cover or sheath 50, as shown or indicated in FIG. 3. The probe leads 45 and 47 extend respectively, to electric conductors 44 and 46, which connect to a temperature read-out means (not shown), as shown in FIG. 3.

An example of a temperature sensor employed in the probe cover of the invention is shown in FIG. 5 in which sensor 80 has a pair of electrical connector conductors 84 and 86 mounted respectively on conductive coatings (e.g. of silver) 85 and 87, on chip 82, as shown in FIG. 5. The temperature sensor 80 is mountable in probe covers e.g., in the manner of heat sensor 30, shown in FIG. 2 or heat sensor 56, shown in FIG. 3.

Figure 6:
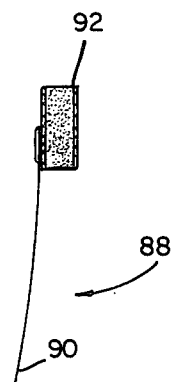
FIG. 6 is an elevation view of another embodiment of a component of the electrical thermometer of the present invention.
Figure 7:
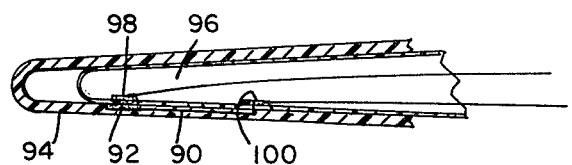
FIG. 7 is a fragmentary, sectional elevation view of components of another embodiment of the electrical thermometer of the present invention

In another temperature sensor embodying the present invention, sensor 88 has a single connector conductor 90 mounted on a sensing element 92, as shown in FIG. 6. Such single conductor temperature sensor is mounted in probe cover 94, as shown in FIG. 7. Probe 96, having electrical connector contact 98 on the surface thereof, is inserted into the probe cover 94 so that it directly contacts the sensor element 92, as shown in FIG. 7. The sensor conductor 90 connects with the electrical connector contact 100 in the probe 96 to complete the circuit as shown in FIG. 7.

Figure 8:
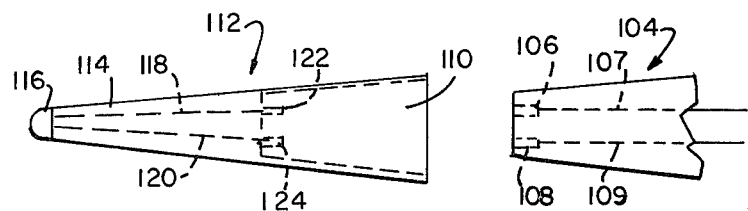
FIG. 8 is a fragmentary, sectional elevation view of components of yet another embodiment of the electrical thermometer of the present invention.

In yet another embodiment of the thermometer of the invention, temperature probe 104 having electrical connector plug receptacle slots 106 and 108, connected respectively to conductors 107 and 109, is inserted into the barrel 110 of the probe cover 112 as shown in FIG. 8. The probe cover 112 has a tapering arm portion 114 which terminates in an electrical temperature sensor 116 mounted thereon, as shown in FIG. 8. The temperature sensor 116 has electrical leads 118 and 120 which extend rearwardly to and electrically connect with, a pair of spaced connector plug prongs 122 and 124, which prongs plug into the receptor slots 106 and 108 of the temperature probe 104 when the latter is inserted into the barrel 110 of the probe cover 112, to make electrical and mechanical contact therewith, as shown or indicated in FIG. 8. The probe conductors 107 and 109 connect with a temperature readout means (not shown) to complete the circuit with the temperature sensor 116 in the manner discussed above. The temperature probe cover 112, after use in measuring the temperature of a body, can be disposed of or sterilized and reused as discussed above.

The electric circuitry of the embodiments of the electric thermometer of the invention is illustrated in partial schematic in FIG. 4 wherein the electrical temperature sensor 60 connects to electric leads 62 and 64 in the probe cover or sheath of the invention (not shown), which leads 62 and 64, electrically contact conductors 66 and 68, mounted on the probe embodying the invention (not shown), which conductors 66 and 68 electrically connect in turn, to a temperature read-out means 70 having a display 72, as shown in FIG. 4. The meter 70 and above circuit are powered e.g., by a D.C. voltage source such as a battery 71, as shown in FIG. 4.

Accordingly, the electric thermometer of the present invention provides an electrically connected probe mounted in a hygienic cover, e.g. a sheath, which in turn, electrically connects to a temperature sensor mounted on the sheath, which sensor comes into close proximity or direct contact with the body being temperature-measured. The body can be an animal or human patient or any other body, solid, liquid, or gas, which, due to the close contact with the temperature sensor on the probe cover, obtains the fastest possible (and most accurate) temperature measurement, due to the novel and improved construction of the thermometer of the present invention.

The temperature sensing probe cover embodying the invention fits at least partially over the probe, ie is mounted on the probe, but need not entirely cover it. Further the probe can be apertured, where it fits over the probe or beyond the extent of the probe end where desired, within the scope of the invention. Preferably however, the cover is an elongated sleeve or sheath closed at its leading end which mounts on or fits over at least a leading portion of said probe. The sleeve can have various shapes rounded or angular including tapered, stepped or straight along its length.

The probe cover is desirably of plastic, e.g. polyethylene, and can be flexible or rigid and preferably is a relatively rigid plastic tube.

The temperature sensing probe covers of the invention are, as indicated above, disposable and the temperature probe of the invention can be used with a succession of sterilized probe covers as desired. Alternatively the probe cover or sheath embodying the invention can be sterilized and re-used with said probe for subsequent temperature taking as desired.

The sensor is preferably mounted on the tip or the side of the probe cover and is preferably mounted to extend through the probe cover to form an outside surface thereof. However such temperature sensor can be mounted below the outside surface of said probe cover, i.e. be recessed or covered with a thin inert layer of material of e.g. plastic or glass or such sensor can be mounted on the inside surface of such probe cover as desired, within the scope of the present invention.

The temperature sensor can be molded in the probe cover during the formation thereof or be subsequently adhered or attached thereto by any suitable means, e.g., by cement.

The temperature sensor can be of various temperature sensing devices e.g., a thermistor, a silicon diode, a thermocouple, or any temperature transducer, which sensors can be in the form of a bead, disc, chip, pellet, rod and the like.

A preferred temperature sensor is a thermistor e.g., a pair of conductive leads mounted in close proximity in e.g., a chip of thermistor material (e.g., semi-conductive metallic oxides). Thermistors exhibit a high (usually negative) temperature coefficient of resistance i.e., the resistance of the thermistor decreases considerably with an increase in temperature thereof. Accordingly a thermistor is highly suitable as a temperature sensor in that it exhibits a relatively large resistance change per degree of temperature change, which change can be accurately measured as a voltage or current change in an electric circuit, which circuit includes a measuring device, e.g., a meter calibrated in terms of temperature.

Various types of thermistors having a positive or negative coefficient of electrical resistivity are obtainable in various forms, including a plurality of conductors extending into a thermistor chip, bead, disc probe, rod and the like and preferably a chip, which can be readily mounted in or on a probe cover or sheath. Examples of the negative type of thermistor material are metallic oxides of manganese, nickel, cobalt, copper and iron and mixtures thereof.

As indicated above, the thermistor or other temperature sensor mounted in the probe cover, can have two or more conductors extending from the temperature sensor in or on such probe cover in the form of e.g., wires or foil and can terminate in a plurality of conductive members e.g., wires, bands or collars in or on such probe cover, which, in turn contact conductors on the probe, as discussed above. However as indicated, such sensor can have but one conductor extending therefrom, e.g. where a conductor on the probe directly contacts the sensor when the probe is inserted into the probe cover, as shown as indicated in FIGS. 6 and 7.

In addition, the temperature sensor of the invention can include two or more transducers, e.g. thermistors, mounted in series or parallel in the probe cover embodying the invention. Such transducers can connect with one or more conductors in the probe cover and/or the probe as discussed above, within the scope of the invention.

The probe of the temperature measuring instrument or thermometer of the invention can be relatively short compared with the probe cover or sheath as long as such probe provides mechanical support and electrical contact for the probe cover embodying the invention. Alternatively, the probe can be elongated and nearly co-extensive with the probe cover or such probe can have various lengths from short to elongated within said probe cover as desired, within the scope of the invention. Further such probe and probe cover can be contoured at corresponding locations with ridges and grooves including nibs and mating recesses, to permit a facile snap-fit and release between the probe and probe cover, as desired. In addition, the probe can have a plurality of conductors thereon in the form of eg, wires, foil, bands and/or collars, positioned to mate with the corresponding conductors of the probe cover for electrical engagement therewith. Alternatively, the probe and cover can each have a plurality of conductors terminating in a plug, the plugs being connectable in electric engagement, e.g., as shown in FIG. 8.

The probe conductors extend from the probe to any suitable temperature read-out means e.g., an A.C. or a D.C. powered meter, digital display instrument or an instrument incorporating a bridge circuit. For an example of an electrical thermometer connected to a meter circuit, see U.S. Pat. No. 3,254,533, which circuit description is incorporated herein by reference. For an example of an electric thermometer in which temperature is measured by a probe having a thermistor which varies current flow through a resistance bridge circuit in combination with a nulling potentiometer (Wheatstone bridge circuit), see U.S. Pat. No. 3,949,609, which circuit description is also incorporated herein by reference.

The electric thermometer of the invention is considerably faster than electric thermometers of the prior art wherein the probe cover encloses the temperature sensor on the prior art probe. The response time of such prior art probe for a temperature reading of a patient is e.g. about 30 or more seconds compared with e.g. 10 seconds or less for the electrical thermometer embodying the present invention.

An advantage of the electric thermometer of the invention is that the probe need not extend the length of the probe cover as indicated, and can be considerably shorter and blunter than such probe cover for greater durability and lower cost of manufacture. A further advantage of having clearance between the end of the probe and the temperature sensor on the probe cover is, the probe is less likely to act as a heat sink and divert heat from the temperature sensor so that the sensor has a faster response and temperature measurement time. Accordingly, the electric thermometer of the invention has a considerably fast response time which is comparable to the response time of the temperature sensor e.g., a thermistor.

Accordingly the electrical thermometer of the present invention provides a faster response time for temperature measurement and display with greater latitude provided for optimum design of a more durable temperature probe.

What is claimed is:

1. An instrument for measuring the temperature of a body and comprising:
   a probe;
   probe connector means retained by said probe and adapted for connection to a temperature read-out means, said probe connector means comprising a plurality of electrical conductors on said probe;
   a cover sheath adapted to be friction fitted over said probe;
   a temperature sensor means mounted at an end of said cover sheath and extending to an outside surface thereof; and
   sheath connector means comprising a plurality of electrical conductors in said cover sheath and electrically coupled to said sensor means, said electrical conductors in said cover sheath being shaped and arranged to interconnect with said electrical conductors on said probe with said cover sheath fitted over said probe.

2. The instrument of claim 1 wherein said cover sheath is removable from said probe and disposable or reusable.

3. The instrument of claim 1 wherein said probe and said cover sheath are elongated with clearance between the end of said probe and the portion of said cover sheath supporting said sensor means.

4. The instrument of claim 1 wherein the electric conductors in said cover sheath terminate in a plug and the electric conductors on said probe terminate in another plug, the plugs being connectable in electrical engagement.

* * * * *